US 011225340B2

(12) United States Patent
Medina et al.

(10) Patent No.: US 11,225,340 B2
(45) Date of Patent: Jan. 18, 2022

(54) LOCAL CONNECTION DEVICE WITH CONTROLLED SEPARATION COMPRISING A MULTIDIRECTIONAL BONDING LAYER

(71) Applicant: ArianeGroup SAS, Paris (FR)

(72) Inventors: Felipe Medina, Sartrouville (FR); Ludovic Glavier, Jouy en Josas (FR)

(73) Assignee: ARIANEGROUP SAS, Paris (FR)

( * ) Notice: Subject to any disclaimer, the term of this patent is extended or adjusted under 35 U.S.C. 154(b) by 224 days.

(21) Appl. No.: 16/556,755

(22) Filed: Aug. 30, 2019

(65) Prior Publication Data

US 2020/0071005 A1   Mar. 5, 2020

(30) Foreign Application Priority Data

Aug. 31, 2018   (FR) ..................... 1857870

(51) Int. Cl.
*B64G 1/64* (2006.01)
*F16B 5/08* (2006.01)
*B64D 1/02* (2006.01)

(52) U.S. Cl.
CPC ............. *B64G 1/641* (2013.01); *B64D 1/02* (2013.01); *B64G 1/645* (2013.01); *F16B 5/08* (2013.01); *B64G 2001/643* (2013.01)

(58) Field of Classification Search
CPC ....... B64G 1/641; B64G 1/645; Y10T 403/11; Y10T 403/21
See application file for complete search history.

(56) References Cited

U.S. PATENT DOCUMENTS 2,581,164 A * 1/1952 Birnbaum ............... F42B 15/36
244/63
5,695,306 A * 12/1997 Nygren, Jr. ............ B64G 1/641
29/426.4
(Continued)

FOREIGN PATENT DOCUMENTS

EP   1196326 B1   7/2004
FR   3 041 609 A1   3/2017
(Continued)

OTHER PUBLICATIONS

Preliminary French Search Report for Application No. 1857870, dated Jul. 15, 2019.
(Continued)

*Primary Examiner* — Joseph W Sanderson
(74) *Attorney, Agent, or Firm* — Pearne & Gordon LLP

(57) ABSTRACT

To enable a local connection with separation on command, a connection device (20) comprises a first base plate (24), a first connection wall (22) forming a protuberance from the first base plate (24) and having an internal surface (22A) delimiting an internal volume (V) located on the side of the first base plate, on a first side, and a first connection surface (22B), a second base plate (28), a second connection wall (26) fixed to the second base plate on a second side and with a second connection surface (26A) covering the first connection wall (22) so as to form a space (S) between the first and second connection surfaces, a bonding layer (30) arranged in the space and extending along at least two distinct directions, and a heat generating material (32) arranged in an internal volume so as to enable heating of the bonding layer.

14 Claims, 5 Drawing Sheets

(56) References Cited

U.S. PATENT DOCUMENTS

| | | | |
|---|---|---|---|
| 10,072,915 B2* | 9/2018 | Medina | B64G 1/641 |
| 10,184,766 B2* | 1/2019 | Medina | B64G 1/645 |
| 10,228,224 B2* | 3/2019 | Comtesse | B64G 1/641 |
| 10,288,391 B2* | 5/2019 | Medina | F42B 1/032 |
| 10,689,134 B2* | 6/2020 | Oldham | F42B 15/36 |
| 2006/0037998 A1* | 2/2006 | Crabol | B64G 1/645 |
| | | | 228/234.3 |
| 2015/0344157 A1* | 12/2015 | Horie | B64G 1/64 |
| | | | 225/96 |
| 2016/0169646 A1 | 6/2016 | Comtesse et al. | |
| 2016/0169647 A1 | 6/2016 | Medina et al. | |
| 2016/0195378 A1 | 7/2016 | Medina et al. | |
| 2017/0010077 A1 | 1/2017 | Medina et al. | |
| 2018/0251220 A1 | 9/2018 | Medina | |
| 2018/0273216 A1* | 9/2018 | Oldham | B64G 1/222 |
| 2020/0010223 A1* | 1/2020 | Partenay | B64G 1/641 |
| 2020/0095074 A1* | 3/2020 | Byers | B66C 1/06 |

FOREIGN PATENT DOCUMENTS

| | | |
|---|---|---|
| FR | 3 055 887 A1 | 3/2018 |
| WO | 2015/014941 A1 | 2/2015 |
| WO | 2015/014942 A1 | 2/2015 |
| WO | 2015/014943 A1 | 2/2015 |

OTHER PUBLICATIONS

U.S. Appl. No. 16/488,443; entitled "Method and Device for the Connection and Linear Separation of Two Elements Stuck Together", filed Aug. 23, 2019.

* cited by examiner

LOCAL CONNECTION DEVICE WITH CONTROLLED SEPARATION COMPRISING A MULTIDIRECTIONAL BONDING LAYER

CROSS-REFERENCE TO RELATED APPLICATIONS

This application claims priority from French Patent Application No. 18 57870, filed Aug. 31, 2018. The content of this application is incorporated herein by reference in its entirety.

DESCRIPTION

Technical Field

This invention relates to the field of connection devices designed to connect a first element and a second element and to separate the first and second elements from each other on command.

In particular, it relates to the structural connection between a payload such as a satellite or a microsatellite, and a payload dispenser, in other words a support structure designed to house and to carry one or several payloads under the cap of an aircraft or space craft, such a support structure sometimes being simply called a "dispenser".

Nevertheless, the invention may also be applied to the connection between a payload and a stage of a space launcher, to the connection between different parts of an aircraft or space craft, or more generally to the local connection of any type of part to be separated on command in a short process (of the order of about ten milliseconds), minimising shocks applied to parts.

State of Prior Art

The multiplication of satellite and microsatellite launches and the attempt to reduce launch costs lead particularly to the development of techniques for sharing launches, by which several satellites or other payloads are loaded on board the same space launcher and are released simultaneously or successively during the same flight.

To achieve this, payload dispensers are systems designed to support several payloads within the same space launcher such as satellites or microsatellites (in other words satellites with a mass typically between 150 kilograms and about 3 tonnes).

The attachment of each payload to such a dispenser requires connection devices capable of resisting the intensity of loads applied in flight, while protecting payloads from shocks that could damage them at the time of release.

Connection devices must also have low dispersion of their reaction time, in other words the time elapsed between a separation command and effective separation, in order to control the thrust induced by use of the separation process that occurs within each connection device, if several of these connection devices are triggered simultaneously.

It is known that a payload can be fastened to a dispenser by means of connection devices comprising two base plates, one fixed to the payload and the other to the dispenser, and connected to each other by connection means that can be disconnected on command, for example as described in document EP1196326. Such disconnectable connection means include for example at least one segmented retention nut, in other words a nut formed from several nut sectors, the sectors being held together by a fusible element or by an element that can be displaced under the effect of a driving element.

In such a connection device, triggering melting of the fusible element or triggering displacement of the displaceable element causes dislocation of the retention nut and therefore separation of the payload and the dispenser.

However, depending on their configuration, known types of connection devices have at least one disadvantage among inducing too powerful shocks during release and having too much dispersion of their reaction time.

Furthermore, in documents WO2015/014942 and WO2015/014943, the applicant presented connection devices designed to connect stages of space launchers or other elements of aircraft or space craft, these systems comprising a cylindrical or tapered adhesive layer, and thermite that will cause heating of the adhesive layer on command to make it lose its adhesion capacity.

These connection devices are annular devices extending along the circumference of stages of a space launcher or other cylindrical parts, and are therefore designed to provide a linear connection distributed around the circumference of the parts to be connected. Due to their shape, these devices are not adapted to the attachment of payloads to a dispenser, this type of attachment generally being based on several local connections for example positioned so as to enable the arrangement of several payloads around a cylindrical or parallelepiped shaped dispenser, or on a flat dispenser.

Local connection devices have also been presented in document WO2015/014941 issued by the applicant. These connection devices comprise a flat shaped adhesive layer.

However these connection devices are not optimised for the attachment of a payload to a dispenser, considering the connection loads involved in this type of application and the severity of mass limitation requirements usually applied to equipment designed to be housed under the cap of an aircraft or space craft.

PRESENTATION OF THE INVENTION

The purpose of the invention is particularly to disclose a connection device that can be used for attachment of a payload to a dispenser, or more generally for the temporary connection of two parts of an aircraft or space craft that does not have the above-mentioned disadvantages.

More generally, the purpose of the invention is a connection device capable of connecting a first element and a second element and that can be used to separate the first and the second elements from each other on command with a short reaction time, preferably less than half a second, with a small dispersion of the reaction time, and minimising the shock applied to the elements during separation.

To achieve this, a connection device according to the invention comprises:
  a first base plate that can be used to fasten the connection device onto a surface of the first element,
  a first connection wall forming a protuberance from the first base plate and having an internal surface delimiting an internal volume located on the side of the first base plate on a first side, and a first connection surface located on a second side opposite the first side,
  a second base plate that can be used to fasten the connection device onto a surface of the second element,
  a second connection wall fixed to the second base plate and with a second connection surface covering the first connection wall so as to form a space between the first and second connection surfaces,
  a bonding layer composed of a layer of adhesive material or a weld, formed in said space in contact with each of the first and second connection surfaces, such that the shape of the bonding layer is such that, when viewed in a section in any plane locally orthogonal to the first base plate, the bonding layer extends along at least two distinct directions, and a heat-generating material arranged in the internal volume so as to heat the bonding layer by thermal conduction through the first connection wall.

Multidirectional conformation of the bonding layer can facilitate stressing of the bonding layer in tension/compression and in shear and transmission of some of the loads by mutual mechanical bearing between portions of the first and second connection walls through the bonding layer, when the connection device according to the invention connects a first element fixed onto or forming part of the first base plate, to a second element fixed onto or forming part of the second base plate.

The efficiency of the connection made possible by multidirectional conformation of the bonding layer enables the connection device to efficiently transmit loads between the connected elements, while remaining compact and light weight, and therefore adapted to a local connection, and particularly to the connection between a payload such as a satellite or a microsatellite and a payload dispenser.

Due to the use of an adhesive layer and thermite, shocks are minimised and reaction times and the dispersion of reaction times are reduced.

According to other advantageous aspects of the invention, the connection device has one or several of the following characteristics, taken in isolation or in any technically possible combination:

the shape of the second connection surface is homothetic with the shape of the first connection surface;

the shape of the bonding layer is symmetric relative to an axis and is such that, when seen in section in any plane containing the axis, the bonding layer extends along at least two distinct directions;

the shape of a section through the bonding layer centred on the axis is a flat or curved bottom U with parallel or divergent sides, or is in the form of a dome, a cone or a truncated part of a cone;

the connection device also comprises an inert support housed in the internal volume and having an external surface facing the first connection wall, and the heat-generating material is arranged in the form of a layer with two opposite surfaces that are in contact with the external surface of the inert support and facing the internal surface of the first connection wall or in contact with the internal surface of the first connection wall, respectively;

the shape of the external surface of the inert support is homothetic with the shape of the internal surface of the first connection wall;

the first base plate comprises a mounting plate provided with an orifice opening up in the internal volume and fixed to the first connection wall, and a cover installed in the orifice so as to close off the orifice, as a result of which the internal volume is defined between the internal surface of the first connection wall and the cover.

The invention also relates to an assembly comprising two elements with surfaces, on which are fixed the first base plate and the second base plate of at least one connection device of the type described above that thus connects the two elements to each other.

The invention also relates to an aircraft or space craft comprising at least one assembly of the type described above.

In preferred embodiments of the invention, the two elements are a payload and a payload dispenser.

Preferably, the two elements are connected to each other by several connection devices of the type described above.

In preferred embodiments of the invention, the aircraft or space craft comprises at least one other payload connected to the payload dispenser by at least one other connection device of the type described above.

BRIEF DESCRIPTION OF THE DRAWINGS

The invention will be better understood and other details, advantages and characteristics will become clear after reading the following description given as a non-limitative example with reference to the appended drawings among which.

In all these figures, identical references can designate identical or similar elements.

DETAILED PRESENTATION OF PREFERRED EMBODIMENTS

Figure 1:
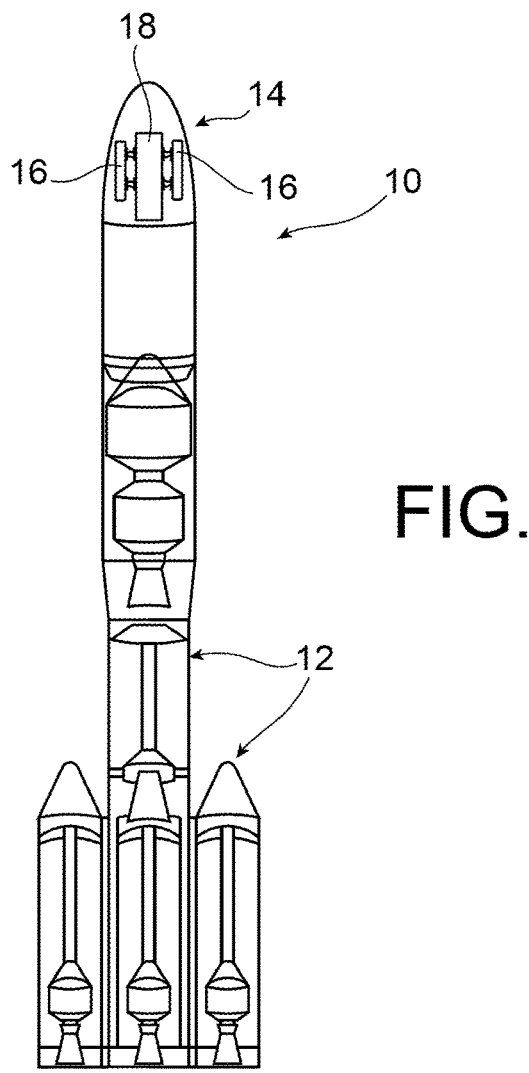
FIG. 1 is a diagrammatic side view of a space launcher according to a preferred embodiment of the invention.

FIG. 1 diagrammatically illustrates a space launcher 10 comprising lower and intermediate propulsion stages 12 and an upper stage 14 housing payloads 16, such as satellites or microsatellites to be put into orbit, mounted on a payload dispenser 18.

Figure 2:
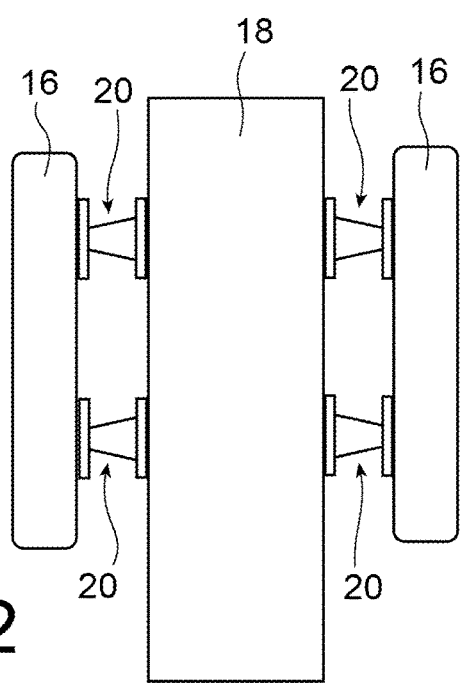
FIG. 2 is a diagrammatic side view of a dispenser on which two satellites are fixed by connection means according to a preferred embodiment of the invention.
Figure 3:
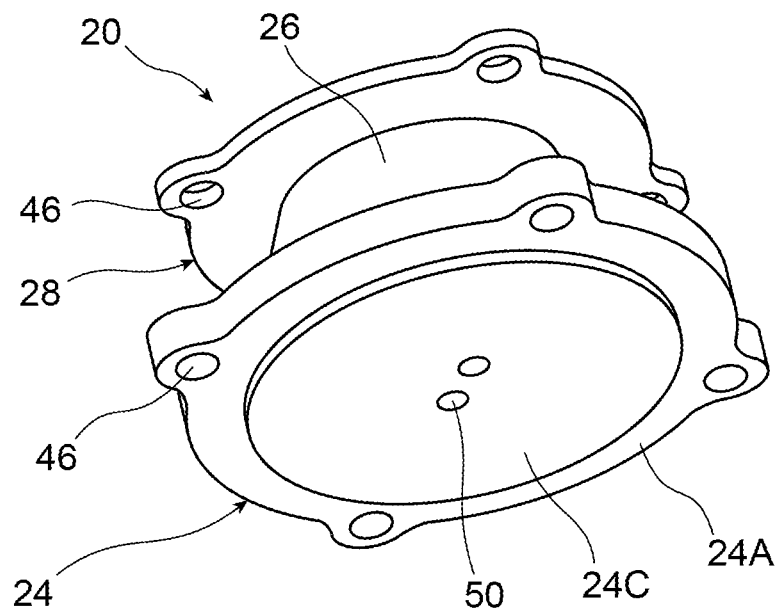
FIGS. 3 and 4 are diagrammatic perspective views of a connection device according to the preferred embodiment of the invention.
Figure 4:
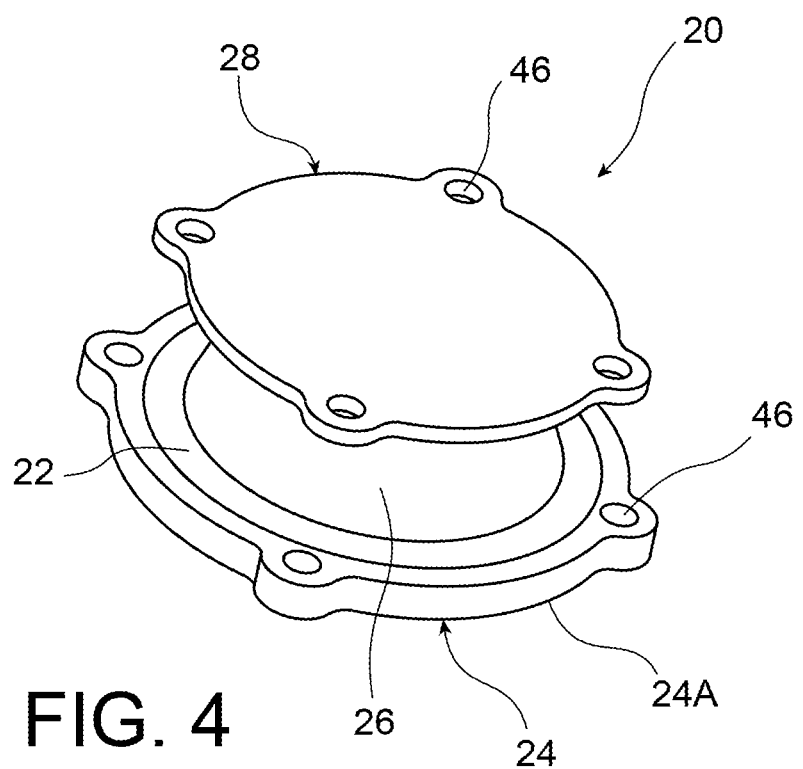
Figure 5:
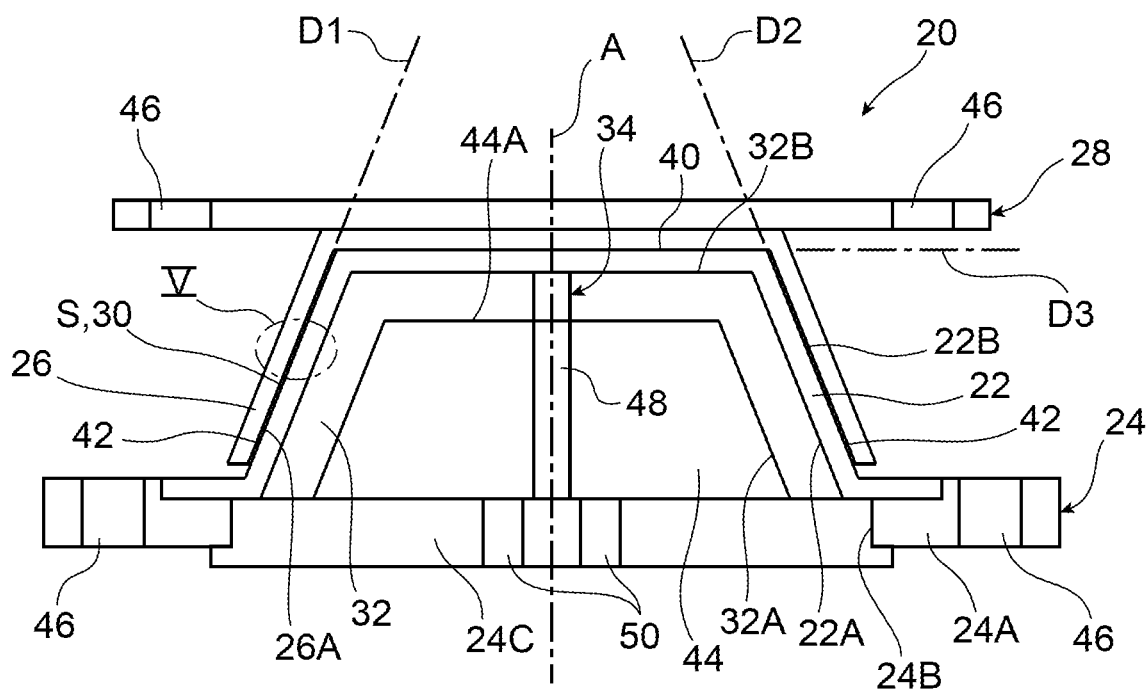
FIG. 5 is a diagrammatic axial sectional view of the connection device in FIGS. 3 and 4.
Figure 5A:
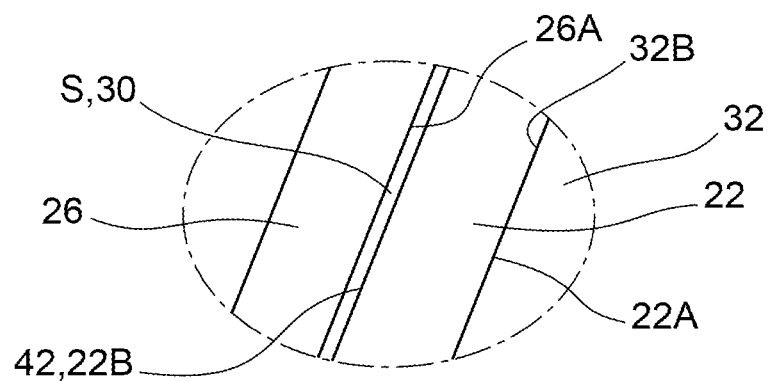
FIG. 5A is an enlarged view of a part V of FIG. 5.

FIG. 2 is a larger scale view diagrammatically showing the payload dispenser 18 and two payloads 16 mounted on the dispenser, each of the payloads being mounted by means of several connection devices 20 according to one preferred embodiment of the invention, the configuration of which is shown in detail on FIGS. 3 to 5.

As can be seen by the set of FIGS. 3 to 5, each of the connection devices 20 comprises:

a first base plate 24 that will be fixed on a surface 18A of the payload dispenser 18, or more generally of one of the parts to be connected, a first connection wall 22 forming a protuberance from the first base plate 24 and having an internal surface 22A delimiting an internal volume V located on the side of the first base plate 24 on a first side, and a first connection surface 22B located on a second side opposite the first side, a second base plate 28 that will be fixed on a surface 16A of the payload 16, or more generally of the other part to be connected, a second connection wall 26 fixed to the second base plate 28 and with a second connection surface 26A covering the first connection wall 22 so as to form a space S between the first connection surface 22B and the second connection surface 26B, a bonding layer 30, preferably composed of a layer of adhesive material such as a thermosetting resin or as a variant a weld, formed in the space S in contact with the first connection surface 22B and the second connection surface 26A, such that the shape of the bonding layer 30 is such that, when viewed in a section in any plane locally orthogonal to the first base plate 24, the bonding layer 30 extends along at least two distinct directions (this property being called a "multi-directional" nature throughout this description), a heat generating material 32 formed in the internal volume V, so as to heat the bonding layer 30 by thermal conduction through the first connection wall 22, such heating being designed to melt the bonding layer 30 or to cause thermal defunctionalisation of the bonding layer 30, in other words the loss of adhesive properties of the bonding layer under the effect of a temperature rise of the bonding layer.

The heat generating material 32 is generally a material capable of generating heat on command.

The heat generating material 32 is preferably thermite. This covers all forms of thermite, including nanothermite (also called superthermite).

The first connection wall 22 is made of a material that is a relatively good conductor of heat, typically a metal or metal alloy, so as to enable fast propagation of heat generated by the heat generating material 32 as far as the bonding layer 30.

The second connection wall 26 is preferably also made from a metal or a metal alloy.

The material(s) from which the connection walls 22 and 26 are made has (have) higher melting points that the melting or defunctionalisation point of the bonding layer 30.

The bonding layer 30 is preferably made of an organic material such as a thermosetting resin, that in particular has the advantage of being a material that is a poor conductor of heat. Thus, heat generated by the thermosetting material 32 is concentrated in the bonding layer 30 without being dispersed by it in the second bonding layer 26.

In preferred embodiments of the invention, the bonding layer 30, each of the first connection surface 22B and the second connection surface 26A has a shape that is symmetric about an axis A. This shape is particularly such that the bonding layer 30 seen in a sectional view in any plane containing the axis A extends along at least two distinct directions.

In particular, the shape of these elements is a shape of revolution about the axis A. Other shapes, for example a polygonal section centred on axis A, are also possible.

Different divergent shapes along the axis A, along the direction from the second base plate 28 to the first base plate 24, are particularly advantageous to procure the multidirectional nature of the above-mentioned elements.

Thus, in the illustrated embodiment, the shape of revolution of each of these elements is a flat-bottomed U shape section 40 with divergent straight sides 42, like a trapezium (the numeric references 40 and 42 are given for example for the first connection surface 22B).

Therefore in this example, when seen in a sectional view in any plane containing axis A, the bonding layer 30 extends along three distinct directions D1, D2, D3 (FIG. 5), corresponding to the directions of the two branches 42 and the direction of the bottom 40 respectively.

As a variant, the U-shaped bottom can be curved, and/or the sides may be straight and parallel, or curved.

Also as a variant, these elements can have a dome or cone-shaped section.

According to another variant, the bonding layer 30 does not necessarily occupy the space located facing the bottom 40 of the first and second connection surfaces 22B, 26A, and is limited to the space facing the sides 42, so as for example to be in the form of a truncated cone.

It should be noted that in the illustrated example, the first connection wall 22 forms a closed protuberance. In other words, the first connection wall 22 is a solid wall with a periphery extending continuously all around the axis A and through which the first connection wall 22 is connected to the first base plate 24.

In the illustrated embodiment, the shape of the second connection surface 26A is homothetic with the shape of the first connection surface 22B Consequently, the shapes of the space S, the first connection surface 22B and the second connection surface 26A are homothetic with each other, in other words they are similar except for a scale factor.

In the illustrated embodiment, the shape of the internal surface 22A is also homothetic with the shape of the first connection surface 22B.

Each of the connection devices 20 also comprises an inert support 44 (FIG. 5) housed in the internal volume V and having an external surface 44A facing the first connection wall 22. Furthermore, the heat generating material 32 is placed in the form of a layer with two opposite surfaces 32A and 32B, the first of which may for example be in contact with the external surface 44A of the inert support 44, while the second is preferably spaced at a small distance from the internal surface 22A of the first connection wall 22.

"Inert" means that the only property of the support 44 is that it occupies part of the internal volume V so as to support the heat generating material 32, and that the support 44 does not contribute in any other manner to operation of the connection device 20 that will be described in detail below.

In the illustrated embodiment, the shape of the external surface 44A of the inert support 44 is homothetic with the shape of the internal surface 22A of the first connection wall 22. Consequently, the shape of each of the opposite surfaces 32A and 32B of the layer of heat generating material 32 is also homothetic with the internal surface 22A of the first connection wall 22.

Furthermore, the first base plate 24 may for example comprise a first assembly base plate 24A provided with an orifice 24B opening up in the internal volume and through which the first base plate 24 is fixed to the first connection wall 22. The first base plate 24 also comprises a cover 24C mounted in the orifice 24B of the first mounting plate 24A so as to close off the orifice 24B. The internal volume V is thus defined between the internal surface 22A of the first connection wall 22 and the cover 24C. In other words, the cover 24C is arranged on one side of the internal volume V opposite the first wall 22, such that the cover 24C closes the internal volume V.

The second base plate 28 may for example be formed from a second mounting plate, to which the second connection wall 26 is fixed.

Each of the first and second base plates 24 and 28 integrates means designed to fix these base plates to the dispenser 18 and to a payload 16 respectively, or more generally to first and second elements that the connection device 20 will connect. For example, these means are composed of orifices 46, distributed around the periphery of each of the first and second base plates 24 and 28, and shaped such that attachment elements such as bolts are rivets can pass through.

Moreover, the first and the second base plates 24 and 28 are preferably fixed to the first and second connection walls 22 and 26 respectively by welding.

Furthermore, the connection device 20 comprises for example an initiation element 48 made of a second heat generating material having a higher combustion rate than the above-mentioned heat generating material, and for example in the form of a bar extending along the axis A through a central reaming of the inert support 44, and a housing formed in the cover 24C to hold a priming device 50, for example an electro-pyrotechnic device configured to activate the initiation element 48. After assembly, the assembly composed of the initiation element 48 and the priming element 50 forms a priming device 34.

The configuration of the connection device 20 make it particularly suitable for making a local connection between a dispenser 18 and a payload 16 such as a satellite or a microsatellite, typically by means of several of these connection devices 20.

Such a connection is made simply by fixing one of the base plates 24 and 28 of each connection device 20 to the dispenser 18 and fixing the other base plate of each connection device 20 to the payload, for example by bolting.

Regardless of the orientation of the connection devices 20, the multidirectional conformation of the bonding layer 30 of each of these devices enables this bonding layer 30 to function in tension/compression and in shear at the same time and to transmit some of the loads by reciprocal mechanical bearing between portions of the first and second connection walls 22 and 26 through the bonding layer 30. Each connection device 20 thus provides an optimum local connection between the dispenser 18 and the payload 16.

Then, when it is required to release the payload 16, triggering of the priming element 50 of each connection device 20 causes fast heating of the heat generating material 32. The heat thus generated is propagated by conduction of heat through the first connection wall 22, as for as the bonding layer 30, and thus causes melting or defunctionalisation of the bonding layer 30, leading to dislocation or loss of bond of this bonding layer. The connection between the dispenser 18 and the payload 16 is then no longer made.

The separation process is characterised particularly by minimal shocks and short reaction times, and by a low dispersion of reaction times between connection devices 20.

In one example embodiment, the reaction times thus obtained have been of the order of 100 milliseconds with a dispersion of less than 10%.

Figure 6:
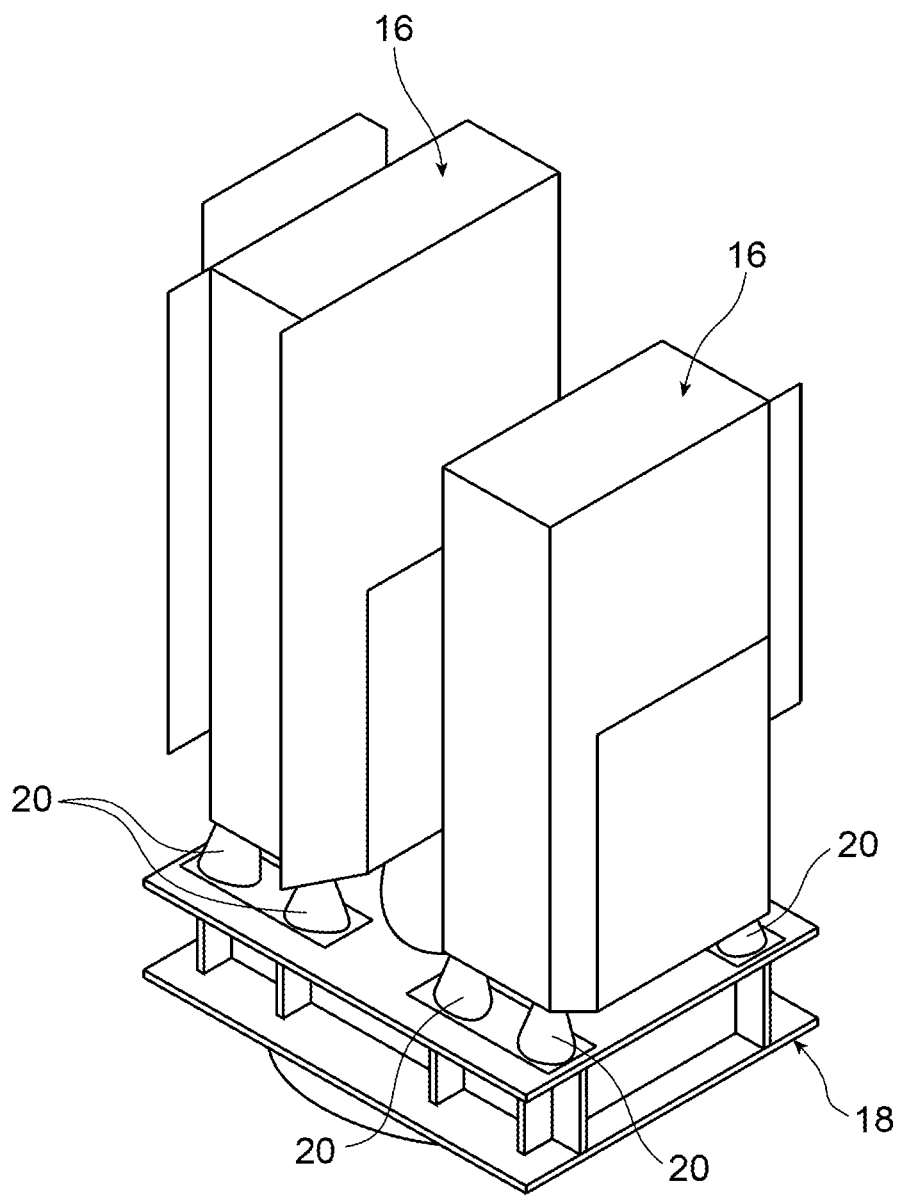
FIG. 6 is a diagrammatic perspective view of another dispenser on which two satellites are fixed by connection means according to the preferred embodiment of the invention.
Figure 7:
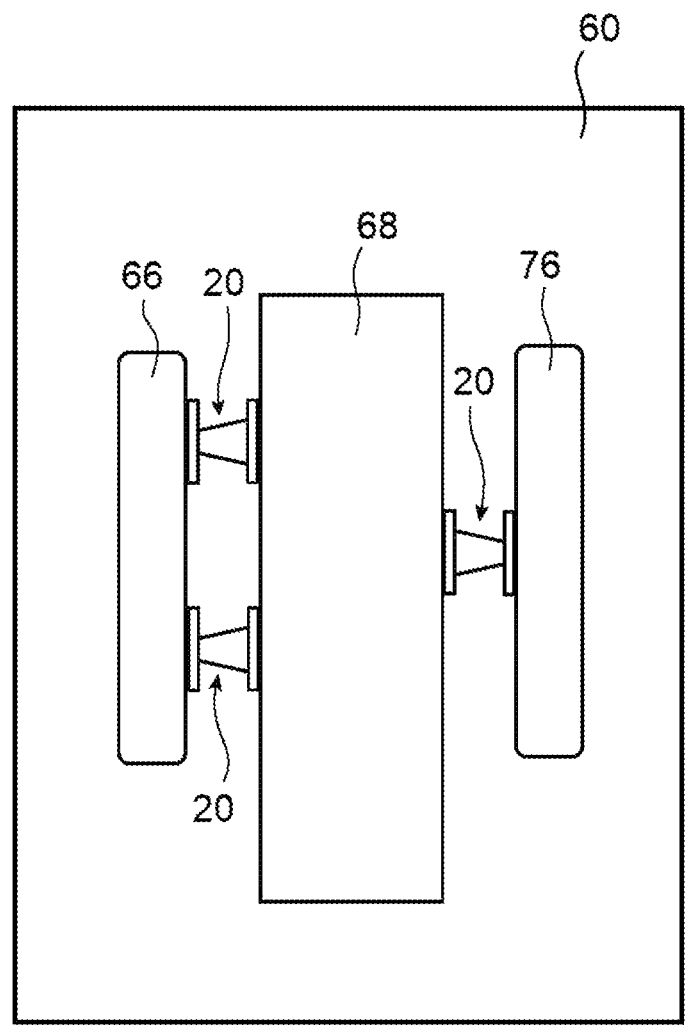
FIG. 7 is a schematic view of an aircraft according to another embodiment of the invention.

FIG. 6 illustrates another context of the use of connection devices 20, in which these connection devices connect a flat dispenser 18 to payloads 16 such as two satellites, arranged above the same flat surface 18A of the dispenser 18. FIG. 7 schematically illustrates an aircraft 60 comprising two elements (i.e., a payload 66 and payload dispenser 68) that are connected to each other by a plurality of connection devices 20. The aircraft 60 also includes another payload 76 connected to the payload dispenser 68 by at least one other connection device 20.

The invention claimed is:

1. A connection device (20) designed to connect a first element (18) and a second element (16) and to separate the first and second elements from each other on command, the device comprising:
   a first base plate (24) that can be used to fasten the connection device (20) onto a surface of the first element (18),
   a first connection wall (22) forming a protuberance from the first base plate (24) and having an internal surface (22A) delimiting an internal volume (V) located on the side of the first base plate (24) on a first side, and a first connection surface (22B) located on a second side opposite the first side,
   a second base plate (28) that can be used to fasten the connection device (20) onto a surface of the second element (16),
   a second connection wall (26) fixed to the second base plate (28) and having a second connection surface (26A) covering the first connection wall (22) so as to form a space (S) between the first and second connection surfaces (22B, 26A),
   a bonding layer (30) composed of a layer of adhesive material or a weld, formed in said space (S) in contact with each of the first and second connection surfaces (22B, 26A), such that the shape of the bonding layer (30) is such that, when viewed in a section in any plane locally orthogonal to the first base plate (24), the bonding layer (30) extends along at least two distinct directions, and
   a heat-generating material (32) arranged in the internal volume (V) so as to heat the bonding layer (30) by thermal conduction through the first connection wall (22).

2. The connection device according to claim 1, wherein the shape of the second connection surface (26A) is homothetic with the shape of the first connection surface (22B).

3. The connection device according to claim 1, wherein the shape of the bonding layer (30) is symmetric relative to an axis (A) and is such that, when seen in section in any plane containing the axis (A), the bonding layer (30) extends along at least two distinct directions.

4. The connection device according to claim 3, wherein the shape of a section through the bonding layer (30) centred on the axis (A) is a flat or curved bottom U (40) with parallel or divergent sides (42), or is in the form of a dome, a cone or a truncated part of a cone.

5. The connection device according to claim 1, also comprising an inert support (44) housed in the internal volume (V) and having an external surface (44A) facing the first connection wall (22), and the heat-generating material (32) is arranged in the form of a layer with two opposite surfaces (32A, 32B) that are respectively facing the external surface (44A) of the inert support (44) and the internal surface (22A) of the first connection wall (22).

6. The connection device according to claim 5, wherein the shape of the external surface (44A) of the inert support (44) is homothetic with the shape of the internal surface (22A) of the first connection wall (22).

7. The connection device according to claim 5, wherein the two opposite surfaces (32A, 32B) respectively contact the external surface (44A) of the inert support (44) and face the internal surface (22A) of the first connection wall (22).

8. The connection device according to claim 7, wherein the two opposite surfaces (32A, 32B) respectively contact the external surface (44A) of the inert support (44) and the internal surface (22A) of the first connection wall (22).

9. The connection device according to claim 1, wherein the first base plate (24) comprises a mounting plate (24A) provided with an orifice (24B) opening up in the internal volume (V) and fixed to the first connection wall (22), and a cover (24C) installed in the orifice (24B) so as to close off the orifice (24B), such that the internal volume (V) is defined between the internal surface (22A) of the first connection wall (22) and the cover (24C).

10. An assembly comprising two elements (16, 18) with surfaces, on which are fixed respectively the first base plate

(24) and the second base plate (28) of at least one connection device (20) according to claim 1 that thus connects the two elements (16, 18) to each other.

11. An aircraft (60) or spacecraft (10), comprising at least one assembly according to claim 10.

12. The aircraft (60) or spacecraft (10) according to claim 11, wherein the two elements (16, 18) are a payload and a payload dispenser respectively.

13. The aircraft (60) or spacecraft (10) according to claim 12, wherein the two elements (16, 18) are connected to each other by a plurality of the connection devices (20).

14. The aircraft (60) or spacecraft (10) according to claim 12, comprising at least one other payload connected to the payload dispenser by at least one other connection device (20).

* * * * *